April 12, 1966  A. J. CERASANI ET AL  3,245,311
DOCUMENT CONVEYOR
Filed July 29, 1963  2 Sheets-Sheet 1

INVENTOR.
WILLIAM G. LEWIS
AMERICO J. CERASANI
MILES DAVIS
BY
*Norman P. Schrader*
ATTORNEY

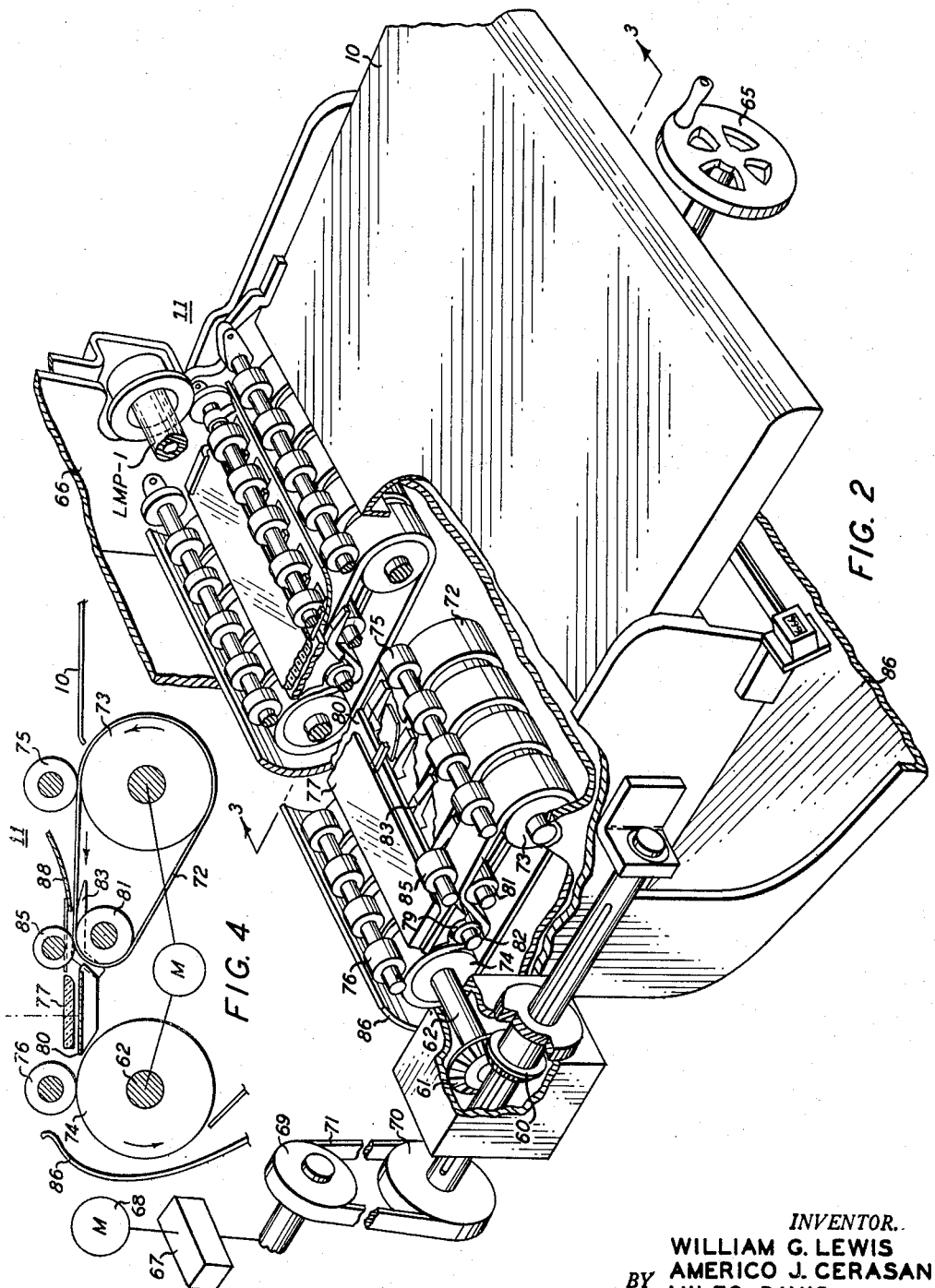

3,245,311
DOCUMENT CONVEYOR
Americo J. Cerasani, William G. Lewis, and Miles Davis, Rochester, N.Y., assignors to Xerox Corporation, Rochester, N.Y., a corporation of New York
Filed July 29, 1963, Ser. No. 300,119
2 Claims. (Cl. 88—24)

This is a continuation-in-part of application Serial No. 42,623, filed July 13, 1960, now abandoned.

This invention relates to improved document feed apparatus for use in reproduction machines. More specifically this invention relates to an improved document feed apparatus for feeding documents past the projection system of a xerographic machine whereby documents of transparent or translucent material are more faithfully reproduced than heretofore.

In the process of xerography, for example, as disclosed in Carlson Patent 2,297,691, issued October 6, 1952, a xerographic plate comprising a layer of photoconductive insulating material on a conductive backing is given a uniform electric charge over its surface and is then exposed to the subject matter to be reproduced, usually by conventional projection techniques. This exposure discharges the plate areas in accordance with the radiation intensity that reaches them, and thereby creates an electrostatic latent image on or in the photoconductive layer. Development of the latent image is effected with an electrostatically charged, finely divided material such as an electroscopic powder that is brought into surface contact with the photoconductive layer and is held thereon electrostatically in a pattern corresponding to the electrostatic latent image. Thereafter, the developed xerographic powder image is usually transferred to a support surface to which it may be fixed by any suitable means.

In xerographic machines in which documents are automatically reproduced, it is customary by means of a document feed apparatus to feed the document past a projection system that exposes the document image onto a previously charged xerographic plate which may be in the form of a cylindrical drum. A typical xerographic machine employing a document feed apparatus is disclosed in copending application Serial Number 837,173, filed August 31, 1959, now Patent No. 3,076,392, in the name of A. J. Cerasani et al., wherein the document feed apparatus thereof includes a plurality of endless belts on which documents are transported past a viewing station of a projection system at a uniform rate in timed relation to the rotation rate of the xerographic drum.

Document feed apparatus of the type disclosed in the copending Cerasani application has proven generally suitable for use in xerographic machines. As will be evident from the description to follow herein, when a document being fed thereby passes the viewing station, it is highly illuminated and its image is reflected into a system of optics which effects image projection onto a sensitized xerographic plate. If the document is of opaque material, radiation of the illuminated non-image or background areas of the document is reflected into the projection system to dissipate charge on the plate in accordance with the intensity of its reflection and if, for example, the non-image areas are white, background reflection effects a substantially complete electrical discharge on the plate surface in areas corresponding thereto. However, difficulty has heretofore been encountered when the document is printed on a transparent or translucent material in that non-image or background areas thereof do not reflect, but instead transmit the light to the opaque endless belts of the feed apparatus on which the document is being transported. This effected belt reflection into the projection system and resulted in "belt marks" being produced on the reproduction copy. The production of belt marks by heretofore used document feed apparatus has constituted a handicap in limiting the type of document material from which images could be faithfully reproduced with the standard of reproduction quality associated with xerography and as is known to those familiar with the art.

Another problem has heretofore been encountered even when reproducing opaque documents. When reproducing documents of different sizes, it is not always convenient or desirable that the reproduction occupy the full width of a support surface on which the reproduction is formed. In this situation belt marks frequently reproduced in the margins of the reproduction necessitating trimming of an unsightly margin that was otherwise not considered objectionable.

The principle object of the invention is to improve document feed apparatus for use in reproduction machines. A further object of the invention is to improve document feed apparatus for use in a xerographic machine whereby documents of transparent or translucent material can be reproduced more faithfully than heretofore. A still further object of the invention is an improved document feed apparatus that prevents the production of undesirable marks in the margin of reproductions.

These and other objects are attained in the preferred embodiment of the invention by means of a document feed apparatus that includes an opaque reflective platform member supported at the viewing station of a projection system substantially in the transport plane of the documents. Documents are advanced over the platform member by means of conveyor belts which are offset from the transport plane to below the platform.

A preferred eembodiment is shown in the accompanying drawings in which:

FIG. 2 is an isometric view of the document feed apparatus of the invention;

FIG. 4 is an alternate embodiment of the invention schematically illustrated in a view similar to FIG. 3.

Figures 1, 3:
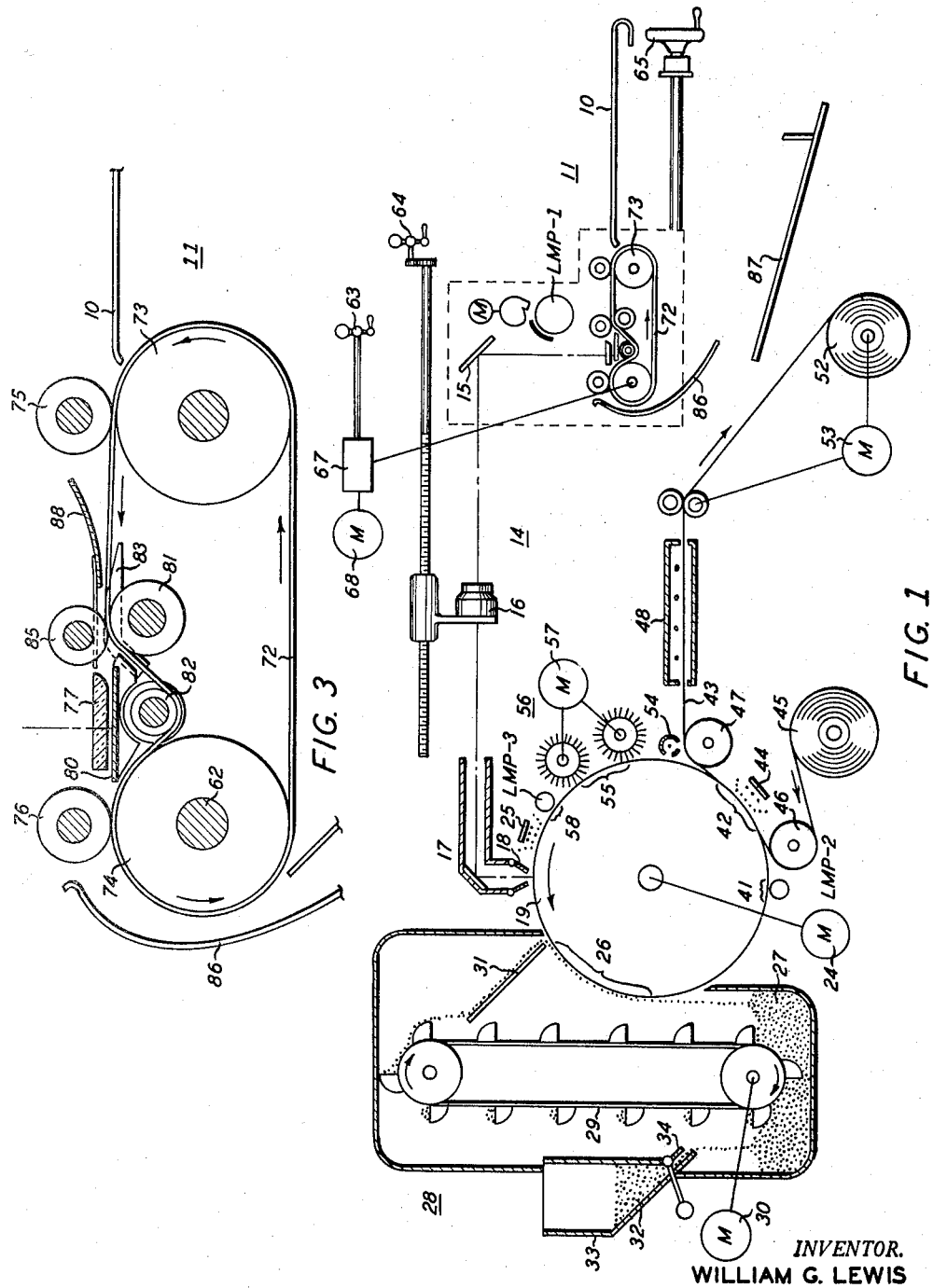
FIG. 1 is a schematic illustration of a xerographic machine incorporating the improved document feed apparatus of the invention.
FIG. 3 is a sectional view taken substantially on line 3—3 of FIG. 2.

For a general understanding of the xerographic processing system in which the invention is incorporated, reference is had to FIG. 1 in which the various system components are schematically illustrated. As in all xerographic systems based on the concept disclosed in the above-cited Carlson patent, a radiation image of copy to be reproduced is projected onto the sensitized surface of a xerographic plate to form an electrostatic latent image thereon. Thereafter, the latent image is developed with an oppositely charged developing material to form a xerographic powder image, corresponding to the latent image, on the plate surface. The powder image is then electrostatically transferred to a support surface to which it may be fused by any suitable form of fusing device, whereby the powder image is caused permanently to adhere to the support surface.

The xerographic apparatus described herein typically may be of the type disclosed in the above cited copending application Serial Number 837,173. In the apparatus, documents to be reproduced are placed on a support tray 10 from which they are fed onto the improved document feed apparatus of the invention, generally designated as 11. By the means described below documents are caused to move past the viewing station of projection lens system 14 that is illuminated by a projection lamp LMP–1. The image of the document is reflected by mirror 15 through an adjustable objective lens 16 and then reflected by mirror 17 downwardly through a variable slit aperture assembly 18 and onto the surface of a xerographic plate in the form of drum 19.

Xerographic drum 19 includes a cylindrical member mounted in suitable bearings in the frame of the machine and is driven in a counterclockwise direction by a motor 24 at a constant rate that is proportional to the transport rate of the document, whereby the peripheral rate of the drum surface is identical to the rate of movement of the reflected radiation image. The drum surface comprises a layer of photoconductive material on a conductive backing that is sensitized prior to exposure by means of a screened corona generating device 25, which may be of the type disclosed in Walkup Patent 2,777,957, that is energized from a suitable high potential source.

The exposure of the drum to the radiation image discharges the photoconductive layer in the areas struck by radiation, whereby there remains on the drum a latent electrostatic image in image configuration corresponding to the radiation image projected from the document. As the drum surface continues its movement, the electrostatic latent image passes through a developing station 26 in which a two-component developing material 27, which may be of the type disclosed in Walkup Patent 2,638,416 is cascaded over the drum surface by means of developing apparatus 28 which may be of the type disclosed in copending application S.N. 393,058, filed November 19, 1953, in the name of Mayo et al.

In the developing apparatus, developing material is carried up by conveyor 29 which is driven by suitable drive means from motor 30 and is released onto chute 31 wherefrom it cascades down over the drum surface. Toner component 32 of the developer that is consumed in developing is stored in dispenser 33 and is dispensed in amounts controlled by gate 34.

After developing, the xerographic powder image passes discharge station 41 at which the drum surface is illuminated by a lamp LMP–2, whereby residual charges on the non-image areas of the drum surface are completely discharged. Thereafter, the powder image passes through an image transfer station 42 at which the powder image is electrostatically transferred to a support surface web 43 by means of a second corona generating device 44 similar to corona charging device 25, mentioned above.

The support surface to which the powder image is transferred may be of any convenient type such as paper and is obtained from a supply roll 45 and is fed over guide rolls 46 and 47, and over suitable tensioning rolls being directed into surface contact with the drum in the immediate vicinity of transfer corona generating device 44. After transfer, the support surface is separated from the drum surface and guided through a suitable fusing apparatus 48 which may be of the type disclosed in Crumrine Patent 2,852,651, whereby the powder image is permanently affixed to the support surface. Thereafter, the support surface is fed over a further system of guide and tensioning rolls and onto a take-up roll 52 that is driven by motor 53.

After separation of the support surface from the drum, a corona generating device 54, which may be of the type described in copending application Serial No. 845,482, filed October 9, 1959, now Patent No. 2,965,756, in the name of R. G. Vyverberg, directs a charge of opposite polarity as the transfer charge to residual developing material on the drum surface and to the support surface before leaving guide roll 47.

Thereafter, the zerographic drum surface passes through a cleaning station 55 at which its surface is brushed by a cleaning brush assembly 56, rotated by a motor 57, whereby residual developing material remaining on the drum is removed. Thereafter, the drum surface passes through a second discharge station 58 at which it is illuminated by a fluorescent lamp LMP–3, whereby the drum surface in this region is completely flooded with light to remove any electrostatic charge that may remain thereon. Suitable light traps are provided in the system to prevent any light rays from reaching the drum surface, other than the projected image, during the period of drum travel immediately prior to sensitization by corona generating device 25 until after the drum surface is completely passed through the developing station 26.

The xerographic apparatus described above includes mechanism to enable reproduction of documents at various different magnification ratios, the adjustments for which are provided through handwheels 63, 64 and 65. The mechanism operative by the handwheels are described in the above cited copending application Serial No. 837,173, but briefly, handwheel 63 is adapted to vary the output speed of variable speed transmission 67 that is driven by motor 68 and through which the feed rate of the document feed apparatus of the invention is effected. Handwheel 64 is adapted to effect positioning of the lens 16 and handwheel 65 is adapted to move the entire document feed apparatus to vary the distance of projection from exposure position on the feed apparatus to the drum surface. The handwheels can be correlatively set for a particular magnification ratio at which the document is to be reproduced.

A preferred form of document feed apparatus of the invention is isometrically illustrated in FIG. 2 and sectionally shown in FIG. 3. As in feed apparatus used heretofore, the apparatus is supported in a frame 66 and a document to be reproduced is fed from tray 10 onto a plurality of spaced endless belts 72 having a traction coating which may be rubber and which adhere by tension to cylindrical rollers 73 and 74. Both rollers are mounted for rotation, the former being adjustable to vary belt tension and the latter is driven by motor 68 through a drive arrangement which includes transmission 67, a pair of pulleys 69 and 70, belt 71, and a pair of bevel gears 60 and 61, which drive shaft 62 on which roller 74 is mounted. A spring loaded idler assembly for varying belt tension is also provided although not shown.

As viewed in FIG. 2, documents are transported on the top surface of the belts and continuous contact therebetween is maintained by a plurality of free-rolling pinch rollers 75 and 76 which ride on the belts and rotate from contact therewith or rotate from contact with a document moving on the belts.

In previous feed apparatus of the type disclosed in the above cited copending application Serial No. 837,173, the document transporting surface of the belts are arranged in a substantially horizontal plane between rollers 73 and 74 and documents transporting thereon pass under a sheet of transparent glass 77 whereunder they pass the optical axis of the projection system (see FIG. 1).

With the improved apparatus of the invention, the document carrying surface of the belts (see FIG. 2) are directed through an offset 79 below a platform member 80 having a reflective surface which preferably is a diffuser reflector that is highly reflective and for convenience may be of vitreous enamel. Belt offset is effected in the vicinity of the projection system by the arrangement of guide roller 82 relative to rollers 81 and 74. After passing over 81 the belts pass under 82 and then pass over roller 74.

In the preferred embodiment, the surface of member 80 is arranged either slightly below or substantially coplanar with the document transport plane of the conveyor belts and extends transverse to their direction of movement and substantially spans the full conveyor width. It is to be noted also that, although illustrated in parallel relation to the belt surface, the platform surface need not necessaritly be parallel to the belt transport plane and it should be obvious that the surface of said member could be inclined from the plane of the belts compatible with a modified illumination and/or projection systems.

Between the belts and extending into the feed direction of documents are a plurality of beveled finger-like guide means 83 which extend between the belts and below the belt surface and have a beveled surface gradually inclined upward in the direction of feed until their uppermost edge is flat and substantially in the same plane as or slightly above the belts' transport surface. The flat of the guide member extends into the vicinity of the belt offset and therefrom extends downward until connecting with member 80. Member 80 is arranged with its reflective surface supported slightly below or substantially in the document transport plane substantially subtending the path of document movement and intersecting the optical axis of the projection system. As a document is transported on the belts, its leading edge between belts passes onto the guide member which directs the continued advance of a document in substantially the same plane in which it emerges from below pinch rollers 85. Thereafter the rear part of a document continues to be advanced forward by the belts to be advanced between glass 77 and the reflective surface of member 80. Before the trailing edge of a document emerges from under pinch rollers 85, which are supported similarly as the other pinch rollers hereof, the leading edge is engaged in the bite of pinch roller 76 against the belts and continued document transport is ensured until colliding with guide plate 86 to descend by gravity into tray 87. Upper guide means 88 extends outward from glass 77 between pinch rollers 85 and serves to prevent buckling of documents as they emerge from under pinch rollers 75.

As a document advances between glass 77 and member 80 it passes the optical axis of the projection system at the viewing station. When reproducing images from opaque documents no particular advantage is derived within the four corners of the reproduction when using the improved document feed apparatus of the invention; however, undesirable marks may be prevented from being reproduced in the margin areas thereof and when reproducing images on transparent or translucent document materials, the transparent or translucent areas are reflected by member 80 with a uniform discharge on the drum surface. By this means the reproduction of sub-reflections, such as belt marks, is prevented.

In operation, the drum continuously rotates and electrostatic charge is applied onto its surface by corona generating device 25. A document to be reproduced, which may be of transparent, translucent, or opaque material is fed from tray 10 onto the continuously moving endless belts 72 of the feed apparatus 11 of the invention. The document is transported by the belts at a predetermined rate in timed relation to the rate of drum rotation. As a document approaches offset 79 of the belts it moves onto guide members 83 which separate the leading edge of a document from the belts at the inception of offset to continue a document advancing in substantially the same plane. Thereafter, a document continues moving between glass 77 and the reflective surface of member 80 to pass the optical axis of the projection system 14. Transparent or translucent areas of a document are reflected from the reflective surface of platform member 80. Before the trailing edge of a document emerges from under pinch-rollers 85, a document's leading edge is gripped in the bite of pinch roller 76 and the belts which have substantially re-entered the transport plane past the offset. Below pinch rollers 76, a document continues to advance until colliding with guide plate 86 and after the trailing edge emerges from under rollers 76 a document descends into collecting tray 87.

Having exposed a radiation image of a document to the drum, the electrostataic latent image formed is developed at developing station 26 by apparatus 28 and the developed image is subsequently transferred to a support surface 43 at transfer station 42. Thereafter the transferred powder image is fused to the support surface by fuser 48 and the drum is cleaned by cleaning assembly 56.

An alternative embodiment of the invention is schematically illustrated in FIG. 4 wherein instead of an offset in the belts, there is an absence or discontinuance of belts between roller 81 and roller 74 and offset roller 82 is omitted. Suitable drive means are provided whereby the belts 72 and the periphery of roller 74 are synchronized for movement at the substantially identical linear rate. As in the preferred embodiment described above, a document to be reproduced is transported on the belts from which it is advanced over the reflective surface of platform member 80 that is similar to the platform member of the preferred embodiment. Thereafter, before the trailing edge of a document emerges from under rollers 85, its leading edge is gripped in the bite of roller 74 and rollers 76 which continue to advance the document until it collides with guide plate 86. As in the preferred embodiment, a document descends by gravity from guide plate 86 into collecting tray 87 and similarly, the reflective member 80 prevents the undesirable reproduction of reflective elements therebelow.

An aperture (not shown) may be provided in the platform member 80 offset from the optical axis of the projection system. By means of such an aperture, light signals can be transmitted for operation of external apparatus of the type disclosed in copending application S.N. 803,800, filed April 2, 1959, now Patent No. 3,105,425, in the name of Cerasani et al.

By the apparatus above described there is disclosed improvements in document feed apparatus for use in a zerographic machine whereby documents, particularly those of the transparent or translucent type, can be more faithfully reproduced than when using feed apparatus of the type employed heretofore.

Since many changes could be made in the above construcion and many apparently widely different embodiments of this invention could be made without departing from the scope thereof, it is intended that all matter contained in the drawings shall be interpreted as illustrative and not in a limiting sense.

We claim:

1. A document feed apparatus for transporting individual documents past a planar exposure station facing an optical system, said apparatus comprising a plurality of substantially parallel spaced-apart belts, first and second belt supporting rollers which support the belts therebetween in a document-feeding plane which is substantially directed toward the exposure station, said second supporting roller being adjacent the exposure station, drive means adapted to longitudinally drive the belts at a predetermined rate in a feed direction to feed documents from said first to said second roller, means cooperating with said second supporting roller to deflect said belts at the exposure station from said document-feeding plane in a direction away from said optical system, an opaque support platen at said exposure station with a diffusely reflecting surface facing said optical system, a transparent platen adjacent said opaque platen and defining a document feed gap therewith, a pinch roller contacting said belts where supported by said second supporting roller and substantially at the point where said belts leave the document-feeding plane, and a plurality of similar finger-like lower guide means, one end of each of which is positioned between said belts before the pinch rollers before the outer surface of said belts and which guide means have an inclined surface gradually inclined upward in the feed direction until they are adjacent to and substantially in alignment with the document feed gap.

2. A document feed apparatus for transporting individual documents past a planar exposure station facing an optical system, said apparatus comprising a plurality of substantially parallel spaced-apart belts, first, second and third belt supporting rollers which support the belts therebetween in a document feeding plane which is substantially directed towards the exposure station, said exposure station lying substantially in the document feeding plane between said second and third rollers, drive means adapted to longitudinally drive the belts at a predetermined rate in a feed direction to said documents from said first to said second rollers, means cooperating with said second and third supporting rollers to deflect said belts at the exposure station from said document feeding plane in a direction away from said optical system, an opaque support platen at said exposure station with a diffusely reflecting surface facing said optical system, a transparent platent adjacent said opaque platen and defining a document feed gap therewith, a pinch roller contacting said belt where supported by said second supporting roller and substantially at the point where said belts leave the document feeding plane, said pinch roller having regions of lesser diameter between regions where it contacts said belts, a plurality of similar finger-like roller guide means, one end of each of which is positioned between said belts beneath the outer surface of said belts and which guide means have an inclined surface gradually inclined upward in the feed direction until they are adjacent to and substantially in alignment with the document feed gap, upper guide means positioned adjacent to the belts and extending from before the pinch roller through the regions of lesser diameter of the pinch roller and terminating adjacent to and substantially in alignment with the document feed gap.

No references cited.

NORTON ANSHER, *Primary Examiner.*